United States Patent [19]

Pickering et al.

[11] Patent Number: 4,906,010
[45] Date of Patent: Mar. 6, 1990

[54] JOINT FOR CONNECTING A SPIGOT TO THE BELL OF A PIPE OR COUPLING

[75] Inventors: Len Pickering; Gilles Lepine; Gord Burnett, all of London, Canada

[73] Assignee: Multi Fittings Inc., London, Canada

[21] Appl. No.: 845,857

[22] Filed: Mar. 27, 1986

[51] Int. Cl.⁴ .................. F16J 15/10; F16L 17/03
[52] U.S. Cl. ..................... 277/207 A; 277/182; 285/110; 285/231
[58] Field of Search ............. 277/207 A, 182, 183, 277/184; 285/110, 345, 230, 231

[56] References Cited

U.S. PATENT DOCUMENTS

| | | |
|---|---|---|
| 2,146,641 | 2/1939 | McWane . |
| 2,272,811 | 2/1942 | Nathan . |
| 2,398,399 | 4/1946 | Alexander ............. 277/207 A |
| 2,620,206 | 12/1952 | Cornelius . |
| 2,953,398 | 9/1960 | Hangen et al. . |
| 2,980,449 | 4/1961 | Dunton . |
| 2,991,092 | 7/1961 | MacKay . |
| 3,217,092 | 11/1965 | Sakurada . |
| 3,244,797 | 4/1966 | Watson . |
| 3,265,410 | 8/1966 | Lorang . |
| 3,315,971 | 4/1967 | Sokurada . |
| 3,362,717 | 1/1968 | Bram . |
| 3,390,890 | 7/1968 | Kurtz ..................... 285/345 X |
| 3,503,619 | 3/1970 | Hainneville . |
| 3,520,047 | 7/1970 | Muhlner et al. . |
| 3,544,119 | 12/1970 | Glover .................. 277/207 A |
| 3,573,871 | 4/1971 | Warner .................. 285/110 X |
| 3,741,570 | 6/1973 | Garrett . |
| 3,813,107 | 5/1974 | Ditcher .................. 285/231 X |
| 3,858,912 | 1/1975 | Bower ..................... 285/230 |
| 3,915,460 | 10/1975 | Kramer . |
| 3,924,999 | 12/1975 | Harris et al. . |
| 3,936,081 | 2/1976 | Blumenkanz . |
| 4,018,461 | 4/1977 | Bram . |
| 4,034,994 | 7/1977 | Ohto et al. . |
| 4,042,263 | 8/1977 | Harrison .................... 285/110 |
| 4,097,074 | 6/1978 | Naggao et al. . |
| 4,143,884 | 3/1979 | Nicholas et al. . |
| 4,182,519 | 1/1980 | Wilson .................. 277/207 A |
| 4,193,426 | 3/1980 | Irmer . |
| 4,331,625 | 5/1982 | van de Zee et al. . |
| 4,343,480 | 8/1982 | Vassallo . |
| 4,361,349 | 11/1982 | Wolf et al. ............... 285/345 X |
| 4,369,159 | 1/1983 | Irmer . |
| 4,432,395 | 2/1984 | Beune et al. ............. 277/207 A |

FOREIGN PATENT DOCUMENTS

| | | |
|---|---|---|
| 1028839 | 4/1978 | Canada . |
| 1158277 | 12/1983 | Canada . |
| 1118551 | 11/1961 | Fed. Rep. of Germany . |
| 2205532 | 8/1973 | Fed. Rep. of Germany . |
| 2299586 | 8/1976 | France . |
| 2339801 | 8/1977 | France . |
| 6615556 | 5/1968 | Netherlands ................ 285/110 |
| 1033756 | 6/1966 | United Kingdom . |
| 1168040 | 10/1969 | United Kingdom . |
| 1547082 | 6/1979 | United Kingdom . |

*Primary Examiner*—Allan N. Shoap
*Attorney, Agent, or Firm*—Ivor M. Hughes

[57] ABSTRACT

An end portion of a pipe fitting or coupling member is provided. The member has a central longitudinal axis, a mouth at its very end, and an annular groove for receiving a gasket. The groove presents a first end wall spaced from and axially facing the mouth. The end wall has a radial inward end and a radial outward end. A radially inwardly facing axially extending bottom wall extends substantially parallel to the longitudinal axis towards the mouth and extends from the radial outward end of the first end wall. The bottom wall terminates at a second wall axially facing the mouth. The second wall extends radially outwardly from the bottom wall has a radial inward end and a radial outward end, the radial inward end of the second wall connected to the bottom wall. The radial outward end of the second wall terminates further from the longitudinal axis than the bottom wall at a radially facing wall which extends axially away from the bottom wall towards the mouth for part of its extension and then being bent over to extend towards the longitudinal axis. A gasket is captured in the groove and has a central longitudinal axis and axially spaced opposing ends interconnected by an outer wall. One of the opposing ends of the gasket engages the first end wall of the groove and the other end of the gasket comprises an offset portion for being received between and in intimate contact with the second wall and radially facing axially extending wall bent over for part of its extension.

19 Claims, 5 Drawing Sheets

JOINT FOR CONNECTING A SPIGOT TO THE BELL OF A PIPE OR COUPLING

FIELD OF INVENTION

This invention relates to joints for connecting lengths of pipe together and specifically joints connecting bells of pipe fittings or couplings (ends of tubular members) to spigots of extruded plastic pipes or fittings using a gasket secured in each bell (tubular member).

BACKGROUND OF THE INVENTION

Joints between bells (tubular members) and spigots for connecting plastic pipe sections together employing a resilient, yieldable gasket therebetween are not new. Such joints comprise a gasket normally secured in a recess of a bell or tubular end at the expanded end of the tubular member (a pipe fitting or coupling for example) for sealing against the outer end surface of a spigot. Such joints offer a quick method of pipe installation which is economical and easy to assemble, thereby eliminating the need for skilled pipe fitting personnel and permitting semi-skilled installers to form the joint. However, as the reader will appreciate, the formation of the seal is paramount. If a satisfactory seal is not the end result of inserting the spigot end into the bell or tubular end of the tubular member (pipe fitting or coupling), then the resultant losses and the ultimate repair can be extremely costly, for example, where the pipe has been buried or embedded in concrete. Hence, the seal created must continue to exist under all conditions to preclude a leakage radially inwardly into the pipe or radially outwardly from the pipe, or both, depending on the application (for example, vacuum, low pressure, high pressure situations) and to ensure the seal is maintained even where there is a shifting in the spigot-bell connection of the pipe buried in the ground. As a result of these requirements, many industry standards have been established, for example, ASTM, and CSA testing criteria to verify the integrity of seals at joints of various applications. In one application, a sewer pipe joint must be able to withstand a test of applied pressure at 10.8 p.s.i. gauge for 10 minutes without a reduction in that pressure. In vacuum applications the tests have required that the pipe system joint must hold 22 inches of mercury for 20 minutes without the gasket joint leaking more than 1 inch of mercury in the first 10 minutes and without the joint leaking more than 5 inches of mercury in the second 10 minute period (see ASTM D3212 Standard).

In order to ensure the integrity of the seal, the gasket must be of such shape and size as to permit uniform annular compression applied by the spigot of the pipe as the spigot is inserted into the bell and after assembly, maintain the positive seal under all conditions applied to the joint. Further, the gasket must prove reliable over a long period of time in use and not sag, elongate, move, slip or disintegrate and must remain pliable, resilient and firm in its intended position to maintain the seal first created. (Applicant directs the reader's attention to ASTM-476 and F477 and CSA standards B182.1 and B182.2 [M1983].)

As a result of the stringent requirements, many different methods and configurations have been proposed for creating a seal using a gasket in a bell between the bell and the spigot. For example, U.K. Patent No. 1,168,040 teaches a pipe coupling employing a bell (tubular member) with a radially inturned lip to retain a sealing ring and an incompressible locking ring dividing the ring into three parts. Other joints are taught in German Patent No. 2,205,532, U.S. Pat. No. 3,915,460, U.S. Pat. No. 3,217,092, U.S. Pat. No. 4,034,994, German Patent No. 1,118,551, U.S. Pat. No. 4,097,074, U.K. Patent No. 1,033,756 and U.S. Pat. No. 4,143,884. Compound elastomeric elements for assisting to create a seal for example, having more than one resilient member working in unison, are taught in U.S. Pat. No. 2,272,811 and U.S. Pat. No. 3,265,410.

U.S. Pat. Nos. 2,146,641, 2,980,449, 3,265,410, 3,503,619, and 4,018,461 teach further gasket-bell configurations used in an attempt to form more secure joints. U.S. Pat. Nos. 2,953,398, 2,991,092, 3,244,797, 3,315,971, 4,097,074, and 4,343,480 (corresponding to Canadian Letters Patent No. 1,158,277), teach various gasket formations having forward and rearward restraining surfaces including a rearward corner for supporting a gasket in a further attempt to provide an improved joint. U.S. Pat. No. 3,520,047 teaches the shaping of the end of the pipe bell from thermoplastic material as well as a form of elastomeric joint in an attempt to provide an improved joint. The method taught by the said Patent teaches a deforming core (see FIG. 9) around which a thermoplastic pipe bell may be formed.

U.S. Pat. No. 3,362,717 is another attempt to provide a suitable joint, teaching the use of a rearward shoulder section of the gasket acting with the bell in unison to provide reinforcement of the seal's ability to remain fixed in its sealing position. The addition of the sheath shown in FIG. 1 is taught to enhance the sealing properties of the joint by coming in contact with 15A of FIG. 2 and area 5 of FIG. 1 of the main gasket.

U.S. Pat. No. 3,741,570 teaches a flexible joint for a sewer pipe with a blunt-cut spigot end. The formed joint comprises a forward shoulder or surface and rearward shoulder or edge upon which the gasket abuts during compression and insertion of the spigot end whereby the rearward shoulder prevents, according to the teachings of the Patent, the gasket from rolling out of position during the insertion process.

U.S. Pat. No. 2,620,206 discloses a pipe coupler seal which incorporates latches and keepers 15 and 14 respectively as shown in FIG. 1, which purport to secure split collar 17 in place. Wall 23 seen in FIG. 3 has been formed by cutting radially outwardly from the inner surface of the coupling to provide an abutment shoulder 21a and annular walls 22 and 23 for receiving gasket 12. Gasket 12 is inserted into the completed groove and thus if inserted can be removed.

In the same vein as U.S. Pat. No. 2,620,206, Applicant has become aware subsequent to its invention to a pipe and a bell joint manufactured by Dyka International BV of Amsterdam, Holland which incorporates the front of a gasket being secured by a bent-forward lip and which gasket, extends rearwardly along the inner surface of the bell.

It is therefore an object of this invention to provide an improved joint between the bell of a pipe fitting or coupling (end of a tubular member) and spigot, incorporating a gasket secureably mounted in the bell in a simple yet highly reliable manner to provide a more effective and reliable seal which seal, when formed by semi-skilled or even unskilled workers, is easily formed. It is a further object of the invention to provide improved components therefor, including gasket and bell. It is still a further object of the invention to provide an improved gasket-bell assembly for use to form the improved joint and method for securing the gasket in the bell.

It is a further object of this invention to firmly secure the elastomeric gasket seat at its forward and rearward ends without the need of cements or adhesives. It is a further object of this invention to provide a configuration of a bell on the end of a pipe fitting or coupling (end of a tubular member) which, when used to secure a gasket during assembly, so secures the gasket in the bell (end of tubular member) such that it remains so during use. It is a further object of the invention to provide a method of manufacturing the bell carrying the gasket (end of the tubular member carrying the gasket).

Further and other objects of the invention will be apparent to those skilled in the art from the following summary of the invention and detailed description of embodiments thereof.

SUMMARY OF INVENTION

According to one aspect of the invention, there is provided an end portion of a member (for example a generally tubular member) having a central longitudinal axis, the member (for example tubular member) at its very end defining a mouth, the end portion having an annular groove for receiving a gasket, the groove presenting a first end wall spaced from, and axially facing, the mouth and having a radial inward end and a radial outward end, a radially inwardly facing axially extending bottom wall extending substantially parallel to the longitudinal axis towards the mouth and extending from the radial outward end of the first end wall, the bottom wall terminating at a second wall axially facing the mouth and extending radially outwardly from the bottom wall, the second wall having a radial inward end and a radial outward end, the radial inward end of the second wall connected to the bottom wall, the radial outward end of the second wall terminating further from the longitudinal axis than the bottom wall, the second wall terminating at its radial outward end at a radially facing wall extending axially away from the bottom wall towards the mouth for part of its extention and then being bent over to extend towards the longitudinal axis;

the gasket being annular, of resilient yieldable material and having a central longitudinal axis, axially spaced opposing ends interconnected by an outer wall extending substantially parallel to the axis of the gasket for engaging the bottom wall of the groove, an inner wall radially closer the longitudinal axis than the outer wall, an integral sealing lip extending from the inner wall of the gasket, one of the opposing ends of the gasket extending from the outer wall towards the longitudinal axis of the gasket for engaging the first end wall of the groove, the other opposing end of the gasket extending away from the longitudinal axis of the gasket and comprising an offset portion on the radial side of the outer wall remote from the longitudinal axis (preferably presenting a curved surface on the axial side of the offset portion remote from the outer wall) the offset portion for being received between, and in intimate contact with, the second wall and, the radially facing axially extending wall bent over (for example partially around) the offset portion to extend towards the longitudinal axis thereby locking the gasket body against movement axially in a direction away from the mouth permitting the sealing lip to be stretched.

In this regard the gasket is restrained against movement longitudinally in the direction away from the mouth so that upon the entry of a spigot (for example a bevelled spigot), the sealing lip is permitted to be stretched away from the mouth (with the opposing ends of the gasket confined or constrained between the mouth of the member and first end wall) decreasing the radial thickness of the sealing lip thus reducing the required insertion force for inserting the spigot into the end portion of the tubular member without compromising the integrity of the seal formed and permitting the stretched sealing lip to fold onto the body of the gasket after the leading end of the spigot has passed the body of the gasket thereby providing an effective seal.

Thus when the sealing lip is stretched and compressed as for example when a spigot is inserted into the member (for example tubular member), the sealing lip may lie on the gasket.

According to another aspect of the invention, the second wall may have a recess opening therethrough (through the second wall) radially spaced from the radial inward end of the second wall, the recess extending generally in the same direction as the bottom towards the first end wall and the offset portion of the gasket comprises a projection extending axially longitudinally away from the mouth and offset portion for extending into the recess preferably in intimate contact therewith (for example filling the recess).

Thus according to another aspect of the invention an end portion of a member having a central longitudinal axis is provided, the member at its very end defining a mouth, the end portion having an annular groove for receiving a gasket carrying an offset portion, the groove presenting a first end wall spaced from, and axially facing, the mouth and having a radial inward end and a radial outward end, a radially inwardly facing axially extending bottom wall extending substantially parallel to the longitudinal axis towards the mouth and extending from the radial outward end of the first end wall, the bottom wall terminating at a second wall axially facing the mouth and extending radially outwardly from the bottom wall, the second wall having a radial inward end and a radial outward end, the radial inward end of the second wall connected to the bottom wall, the radial outward end of the second wall terminating further from the longitudinal axis than the bottom wall, the second wall having a recess opening therethrough radially spaced from the radial inward end of the second wall, the recess extending generally in the same direction as the bottom wall towards the first end wall and the offset portion of the gasket carries a projection extending axially longitudinally away from the mouth and offset portion for extending into the recess in intimate contact therewith, a radially facing wall extending axially away from the bottom wall towards the mouth for part of its extension and then being bent over to extend towards the longitudinal axis; the gasket being annular, of resilient yieldable material and having a central longitudinal axis, axially spaced, opposing ends interconnected by an outer wall extending substantially parallel to the axis of the gasket engaging the bottom wall of the groove, an inner wall radially closer the longitudinal axis than the outer wall, an integral sealing lip extending from the inner wall of the gasket, one of the opposing ends of the gasket extending from the outer wall towards the longitudinal axis of the gasket engaging the first end wall of the groove, the other opposing end of the gasket extending away from the longitudinal axis of the gasket and comprising an offset portion on the radial side of the outer wall remote from the longitudinal axis, the offset portion being received between, and in intimate contact with the second wall and the radially facing axially extending wall bent over the offset portion to extend towards the longitudinal axis thereby locking the gasket body against movement axially in a direction away from the mouth permitting the sealing lip to be stretched.

Further according to another aspect of the invention, an end portion of a member is provided the end portion carrying a gasket, the end portion comprising a mouth, a central longitudinal axis, an axially facing first end wall remote from the mouth, a radially facing axially extending wall extending towards the mouth for part of its extension and being bent over to extend towards the longitudinal axis, an axially facing radially extending second wall closer to the mouth than the axially facing first end wall, said second wall having an inner radial end and an outer radial end, the radially extending second wall has a recess opening therethrough radially spaced from the inner radial end, the recess extending generally in the same axial direction as the longitudinal axis, a bottom wall extending longitudinally away from the mouth to the axially facing first end wall extending radially towards the central longitudinal axis, each gasket comprising a central longitudinal axis, opposing ends, an outer wall extending parallel to, and spaced radially from the longitudinal axis of the gasket and interconnecting the opposing ends, an inner wall closer the longitudinal axis of the gasket than the outer wall, a sealing lip, one of the opposed ends carrying an offset portion radially offset from the outer wall on the radial side of the outer wall remote from the longitudinal axis of the gasket, the offset portion carries a projection, which projection extends axially parallel to the outer wall and longitudinal axis and extends axially away from said mouth, the offset portion being received between and in intimate contact with the second wall and the radially facing axially extending wall bent for part of its extension over the offset portion, the projection being received in the recess in the second wall, thereby locking the gasket against movement axially in a direction away from the mouth.

According to another aspect of the invention, improved end portion of members - gaskets assemblies in accordance with embodiments of the invention are provided, each end portion of the member (for example tubular member) comprising a mouth, a central longitudinal axis, a radially facing axially extending wall extending away from the mouth for part of its extension and then being bent over to extend towards the longitudinal axis, an axially facing radially extending second wall having an inner radial end and an outer radial end, the outer radial end joined to the axially extending wall, (in one embodiment, the radially extending second wall having a recess opening therethrough (through the radially extending second wall radially spaced from the inner radial end, the recess extending generally in the same axial direction as the longitudinal axis), a bottom wall extending longitudinally away from the mouth from the inner radial end of the second wall to an axially facing first end wall extending radially towards the central longitudinal axis [preferably terminating in a longitudinally extending lip extending towards the mouth], said gasket comprising a longitudinal axis, axially spaced opposing ends, an outer wall extending parallel to, and spaced radially from the longitudinal axis of the gasket interconnecting the opposing ends, an inner wall closer the longitudinal axis of the gasket than the outer wall, a sealing lip [carried for example on a sealing wing disposed intermediate the opposing ends], one of the opposing ends carrying an offset portion radially offset from the outer wall on the radial side of the outer wall remote the longitudinal axis of the gasket (in one embodiment the offset portion presenting a curved surface on the axial side of the offset portion remote from the outer wall and in another embodiment the offset portion carrying a projection on the axial side of the offset portion closer to the outer wall which projection extends axially parallel to the outer wall and longitudinal axis), the offset portion for being received between, and in intimate contact with, the second wall and the radially facing axially extending wall bent over the offset portion to extend towards the longitudinal axis thereby locking the gasket body against movement axially in a direction away from the mouth and permitting the sealing wing to be stretched.

According to another aspect of the invention, the projection may be the same shape (for example rectangular) and size as the recess. In one embodiment the recess and projection may each be rectangular and of the same size. Thus, the projection completely fills the recess.

In one embodiment the axially facing first end wall may extend towards the central longitudinal axis of the member (for example tubular member) at an angle of less than about 90 degrees to the bottom wall of the groove.

In another embodiment the first end wall may extend towards the central longitudinal axis at an angle of substantially 90 degrees to the central longitudinal axis.

According to another embodiment the first end wall extending towards the central longitudinal axis may form an arc curving towards the mouth of the member, for example an arc of a circle.

According to another embodiment, the first end wall may terminate at its radial inward end at a lip directed axially longitudinally towards the mouth of the member.

According to another aspect of the invention the axially facing first wall carries a longitudinally extending lip extending towards the mouth which overlies the opposing end of the gasket remote the offset portion.

According to another embodiment of the invention, the offset portion of the gasket may present a wall which may extend radially away from the longitudinal axis of the gasket at an angle of about 90 degrees to the longitudinal axis of the gasket for being connected to the outer wall of the gasket.

According to another embodiment of the invention, the sealing lip may extend in a direction obliquely angularly away from the offset portion of the gasket to an end radially spaced from the inner wall, the end overlying the inner wall of the gasket (with no gasket material therebetween) permitting the end of the sealing lip to be folded to lie on the inner wall of the gasket when the sealing lip is folded onto the gasket.

According to another aspect of the invention the radially facing wall extending axially towards the mouth for part of its extension and being bent over to extend towards the longitudinal axis, terminates radially inwardly of the bottom wall of the end portion of the member.

According to another aspect of the invention the radially facing wall extending axially towards the mouth for part of its extension and being bent over to extend towards the longitudinal axis, terminates radially inwardly of the bottom wall of the end portion of the member to substantially overlap the radial inward end of the first end wall.

Therefore, in one embodiment when the radially facing wall extending away from the bottom wall is bent over the offset portion of the gasket to extend towards the longitudinal axis capturing the offset portion between the now bent over wall and second wall, and with the outer wall of the gasket engaging the bottom of the groove and with the opposing end of the gasket extending from the outer wall extending towards the longitudinal axis of the gasket engaging the first end wall, the gasket is locked against movement longitudinally in the direction away from the mouth so that upon entry of a spigot the sealing lip is permitted to stretch away from the mouth decreasing the radial thickness of the sealing lip thus reducing the required insertion force for inserting the spigot into the member without compromising the integrity of the seal formed and permitting the stretched sealing lip to fold onto the gasket after the leading end of the spigot has passed the body of the gasket thereby providing an effective seal.

According to another aspect of the invention, an improved annular gasket of resilient yieldable material is provided the gasket having a central longitudinal axis, opposing ends interconnected by an outer wall extending substantially parallel to the axis of the gasket, an inner wall closer to the longitudinal axis than the outer wall, an integral sealing lip on the gasket extending angularly towards the longitudinal axis of the gasket away from the outer wall, one of the opposing ends of the gasket extending from the outer wall towards the longitudinal axis of the gasket, the other opposing end of the gasket comprising an offset portion on the radial side of the outer wall remote from the longitudinal axis, (the offset portion preferably presenting a curved surface on the axial side of the offset portion remote the outer wall and also preferably carrying a projection radially spaced from the outer wall and extending generally in the same direction as the outer wall towards the other opposing end), the sealing lip extending angularly away from the gasket to an end radially spaced from the inner wall of the gasket (preferably with no gasket material between the inner wall of the gasket and the end of the sealing lip) to permit the sealing lip to be folded towards the gasket and when folded to cause the end of the sealing lip to lie on the inner wall of the gasket.

In one embodiment the other opposing end of the gasket carries an offset portion carrying a projection (for example rectangular) extending angularly generally in the same direction as the outer wall towards the other opposing end.

In another embodiment the sealing lip extends angularly (obliquely) away from the gasket and is carried by a wing extending angularly towards the longitudinal central axis and away from the outer wall, the wing terminating at the end (the end being radially spaced from the inner wall of the gasket in one embodiment with no gasket material between the end and the inner wall of the gasket), the wing being foldable onto the inner wall when the sealing lip forms a seal with for example a spigot. Upon the entry of a spigot (for example a bevelled spigot), into a tubular member for example carrying the gasket, the wing carrying the sealing lip is permitted to stretch away from the mouth decreasing the radial thickness of the wing thus reducing the required insertion force for inserting the spigot into the end of the tubular portion without compromising the integrity of the seal formed, permitting the stretched wing (and the end of the wing) to fold onto the body of the gasket after the leading end of the spigot has passed the stretched wing thereby providing an effective seal.

In another embodiment of the invention, the gasket and wing are of such length that the end of the wing engages the body of the gasket when the wing is folded onto the body of the gasket.

According to another aspect of the invention, a process of manufacturing a member - gasket (for example tubular member - gasket) assembly is provided whereby a gasket (as previously described) is secured in the end of a member (as previously described), the process comprising the steps of:

(a) placing the gasket in the mouth of a member as previously described except with the radially facing wall extending axially away from the bottom as yet being unbent, with the opposing end of the gasket extending from the outer wall extending towards the longitudinal axis abutting the first end wall, (and between, the lip where present on the radial inward end of the first end wall and, the bottom wall of the groove), the outer wall of the gasket abutting the bottom wall of the groove and the offset portion abutting the second wall (and where present with the projection in the recess) and (b) bending the radially facing wall extending axially away from the bottom wall, towards the longitudinal axis of the tubular member over (for example at least partially around) the offset portion causing the offset portion to be sandwiched between the second wall and the bent over radially facing wall, thereby locking the gasket at the mouth of the tubular member.

According to another aspect of the invention, a process of manufacturing improved member gasket (tubular member - gasket) assemblies in accordance with embodiments is provided, each member (for example tubular member) comprising a mouth, a central longitudinal axis, a radially facing axially extending wall extending away from the mouth generally in the same direction as the longitudinal axis, an axially facing radially extending second wall having an inner radial end and an outer radial end, the outer radial end joined to the radially extending wall, (in one embodiment, the radially extending wall having a recess opening therethrough (through the radially extending wall), the recess extending generally in the same direction as the longitudinal axis, a bottom wall extending longitudinally away from the mouth from the inner radial end of the wall to an axially facing first end wall extending radially towards the central longitudinal axis [preferably terminating in an axially longitudinally extending lip extending towards the mouth], the gasket comprising a longitudinal axis, opposing ends, an outer wall extending parallel to, and spaced radially from the longitudinal axis of the gasket interconnecting the opposing ends, an inner wall closer the longitudinal axis of the gasket, through the outer wall, a sealing lip [carried for example on a sealing wing disposed intermediate the opposing ends], one of the opposing ends carrying an offset portion radially offset from the outer wall on the radial side of the outer wall remote the longitudinal axis of the gasket (in one embodiment, the offset portion presenting a curved surface on the axial side of the offset portion remote from the outer wall) (in another embodiment, the offset portion carrying a projection on the axial side of the offset portion closer the outer wall and extending axially parallel to the outer wall and longitudinal axis), the process comprising the steps of:

(a) placing the gasket in the mouth of the member (for example tubular member) with the opposing end of the gasket extending from the outer wall extending towards the longitudinal axis abutting the first end wall (and between the lip, where present on the radial inward end of the first end wall and, the bottom wall of the groove), the outer wall of the gasket abutting the bottom wall of the groove and the offset portion abutting the second wall and the radially facing axially extending wall extending away from the mouth (and where present the projection is in the recess), and (b) bending the radially facing axially extending wall (extending away from the mouth) towards the longitudinal axis of the member over the offset portion causing the offset portion to be sandwiched between the second end wall and the bent over radially facing wall, thereby locking the gasket at the mouth of the tubular member.

DETAILED DESCRIPTION OF THE DRAWINGS

Figure 2:
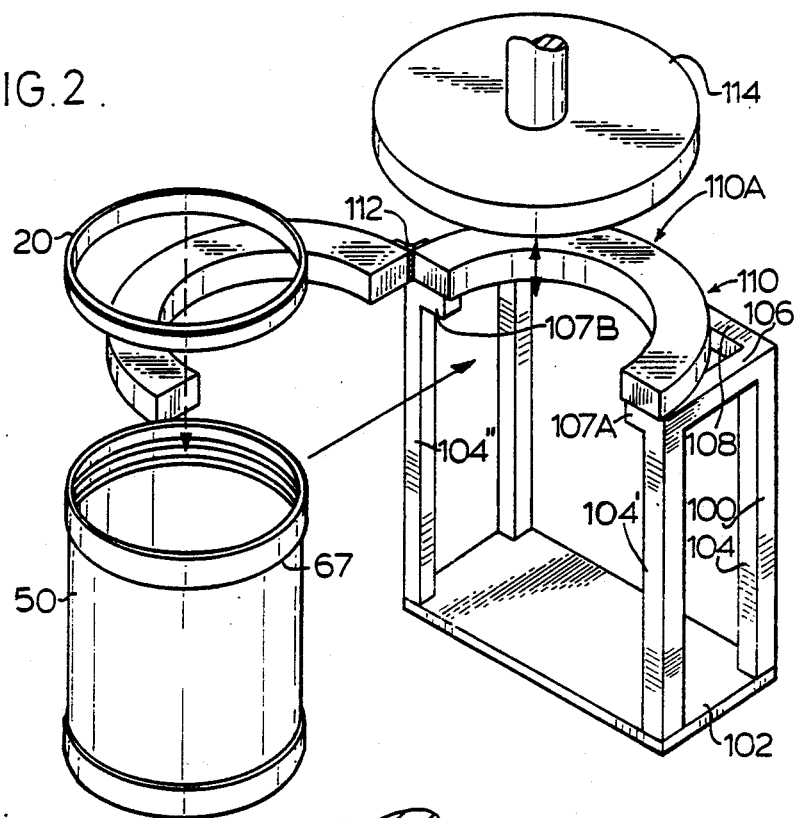
FIG. 2 is a perspective view of the components used for securing the gasket in the bell of the coupling (the end of the tubular member) manufactured according to the preferred embodiment of the invention.
Figure 4:
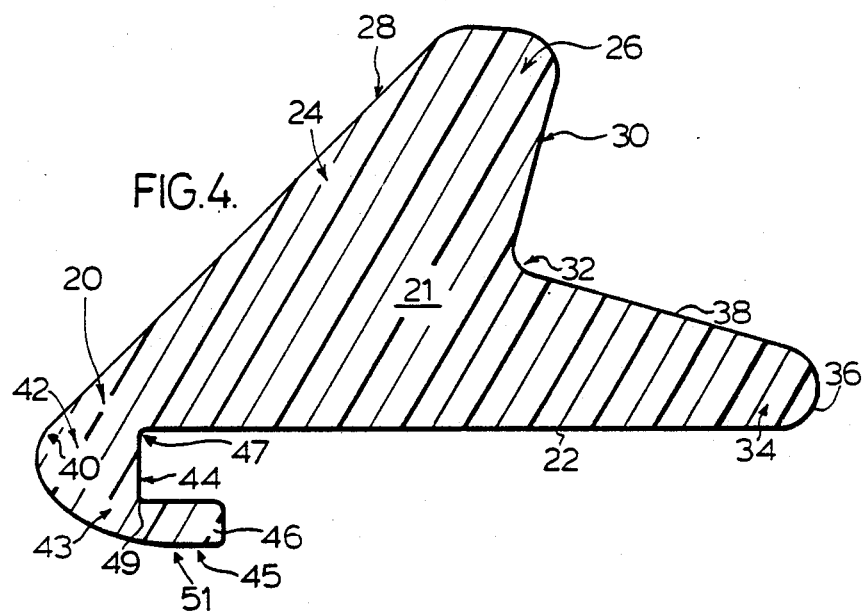
FIG. 4 is a cross-sectional view of the gasket in a non-deformed state according to the preferred embodiment of the invention.

With reference to FIGS. 2 and 4, resilient annular gasket 20 (in cross-section) comprises, bottom wall or outer wall 22 connecting opposing ends 34 and 40, inner wall 38, and sealing lip or wing 24 carrying sealing surface 28 (remote bottom 22) extending angularly away from end 40. Wing 24 terminates at end 26. Side 30 of wing 24 slopes generally radially inwardly and towards the front of gasket 20 so that when wing 24 is bent at 32 (the point where side 30 of wing 24 is joined to inner wall 38), wing 24 will lie on inner wall 38 of gasket body 21. Opposing end 34 of gasket 20 carries circular curved outer wall 36.

At opposing end 40 of gasket 20, offset portion 42 extends generally axially away from outer wall 22 and radially on the side of bottom wall remote wing 24. Offset portion 42 includes frontal curved portion 43 (between the numerals 40 and 51) and rear wall 44. Rear wall 44 is connected at its radial inward end 47 to outer wall 22 and at its outer radial end 49 to rectangular resilient portion or projection 46 extending axially longitudinally away from offset portion 42. Curved portion 43 begins at point 51 which point 51 is longitudinally closer to end wall 36 at opposing end 34 than the juncture 49 of rectangular portion 46 with wall 44. Side 45 of rectangular projection 46 is flat.

Figure 1:
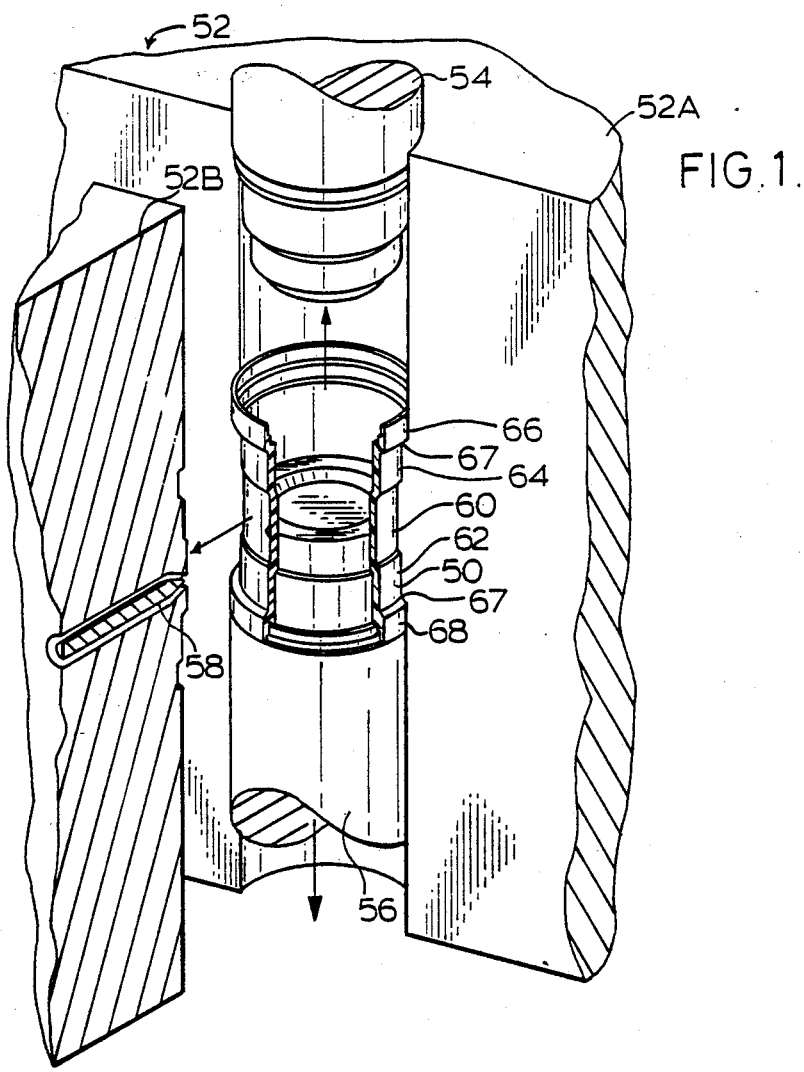
FIG. 1 is a perspective partially-exploded view, partly in cross-section, of the mould of an injection moulding apparatus used in the manufacture of a preferred embodiment of the invention.

Coupling or tubular member 50 (see FIG. 2) is injection moulded with reference to injection moulding apparatus in FIG. 1. With reference to FIG. 1, mould 52 is shown as comprising male mould members 54 and 56 inserted into female mould portion 52 formed by two halves 52A and 52B. After plastics material is injected into the mould through nozzle 58, the preferred embodiment of the invention is the result and the cooled plastic coupling 50 ejected.

With reference to FIG. 1, coupling 50 comprises annular central connecting wall 60, radially of lesser diameter than any pipe spigot to be introduced into the coupling. Wall 60 is connected on either axial end to annular walls 62 and 64 which have a radius greater than any pipe spigot that may be introduced into coupling 50. Axially forwardly of each of walls 62 and 64 are bell couplings or tubular members 66 and 68. As can be seen, the interior configuration of the mould is such to provide the resultant component parts of coupling 50, including connector wall 60, walls 62 and 64, and members or bell couplings 66 and 68. Each of members 66 and 68 in cross-section has a configuration shown in FIG. 5.

Figure 5:
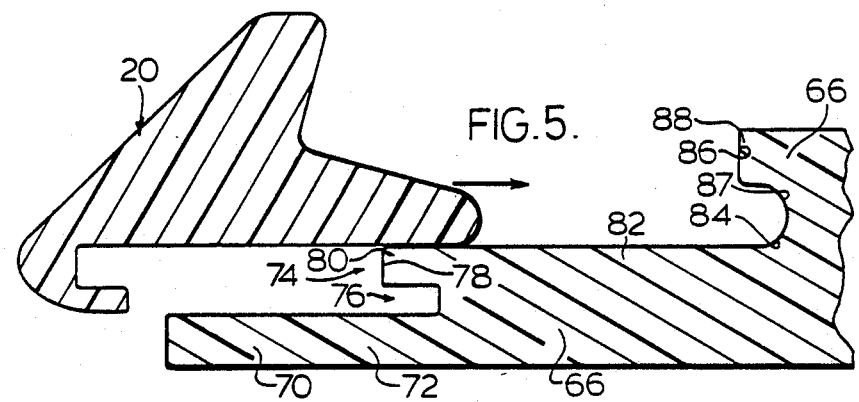
FIG. 5 is an exploded close-up cross-sectional view of some of the components seen in FIGS. 2 and 3 ready for assembly.

With reference to FIG. 5, bell coupling or member 66 comprises radially facing axially extending front thin wall 70 extending at its rear end 72 to radially inwardly-extending axially facing wall 74 having rectangular recess 76 opening through wall 74, recess 76 conforming in size and shape to projection 46 of gasket 20. Wall portion 78 of wall 74 is of the same length as wall 44 of gasket 20. When gasket 20 is inserted into bell coupling 66 shown in FIG. 3, projection 46 fills recess 76 with corner 47 of gasket 20 engaging corner 80 of coupling 66 and wall 44 of gasket 20 engages wall 74. Bottom wall 82 for receiving bottom 22 of gasket 20 extends longitudinally away from corner 80, is of a length to accommodate outer wall 22 of gasket 20, and terminates in axially facing radially inwardly wall 84, curving in arc 87 (a part thereof being circular) radially inwardly away from bottom wall 82 to lip 88 which lip 88 extends longitudinally away from wall 84 to point 86 (thus providing a forwardly opening second groove at the end of bottom wall 82 remote wall 74).

For securing gasket 20 into bell coupling 66 and locking it in bell 66, gasket 20 is positioned such that bottom 22 sits on bottom 82, end wall 36 abuts wall 84 (of the forwardly opening second groove), projection 46 on offset portion 42 sits in recess 76, wall 44 abuts wall portion 78, and offset portion 42 sits on wall 70. Thereafter wall 70 is bent over curved portion 43 of gasket 20, compressing portion 42 of gasket 20 and locking it in position (see FIG. 6) between wall 74 and wall 70.

Figure 3:
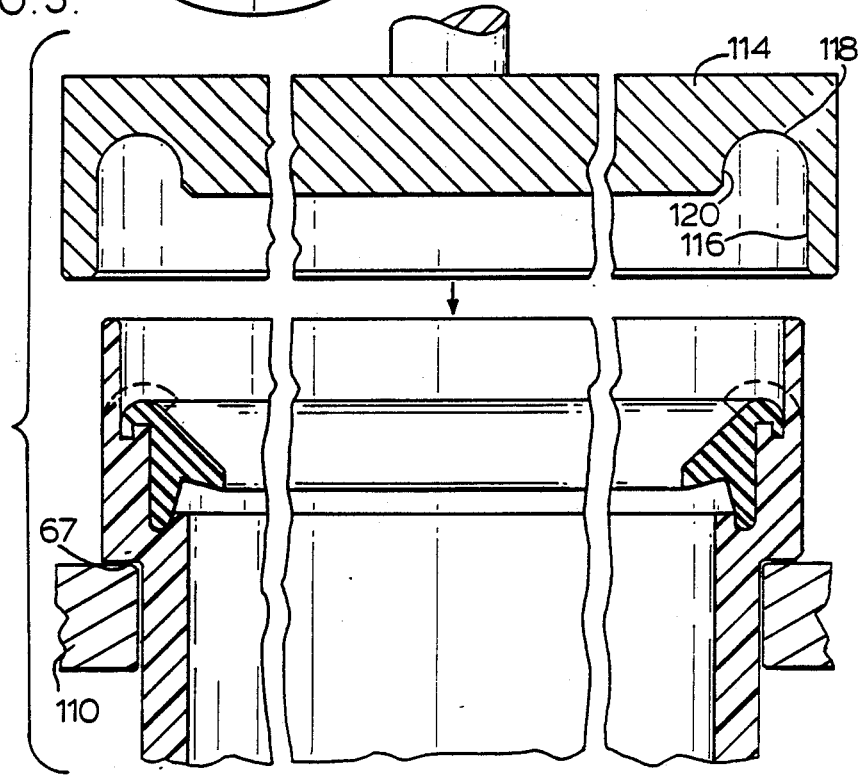
FIG. 3 is a front, cross-sectional view of the components in FIG. 2, aligned and ready for use to secure the gasket in the coupling according to the preferred embodiment of the invention.
Figure 6:
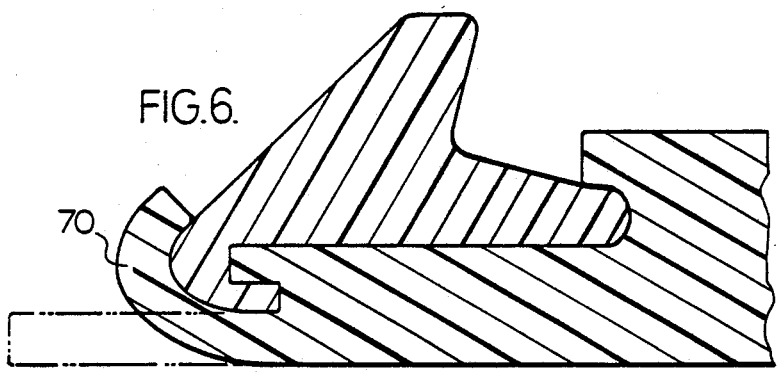
FIG. 6 is a cross-sectional view of the components shown in FIG. 5 with the gasket secured.
Figure 7:
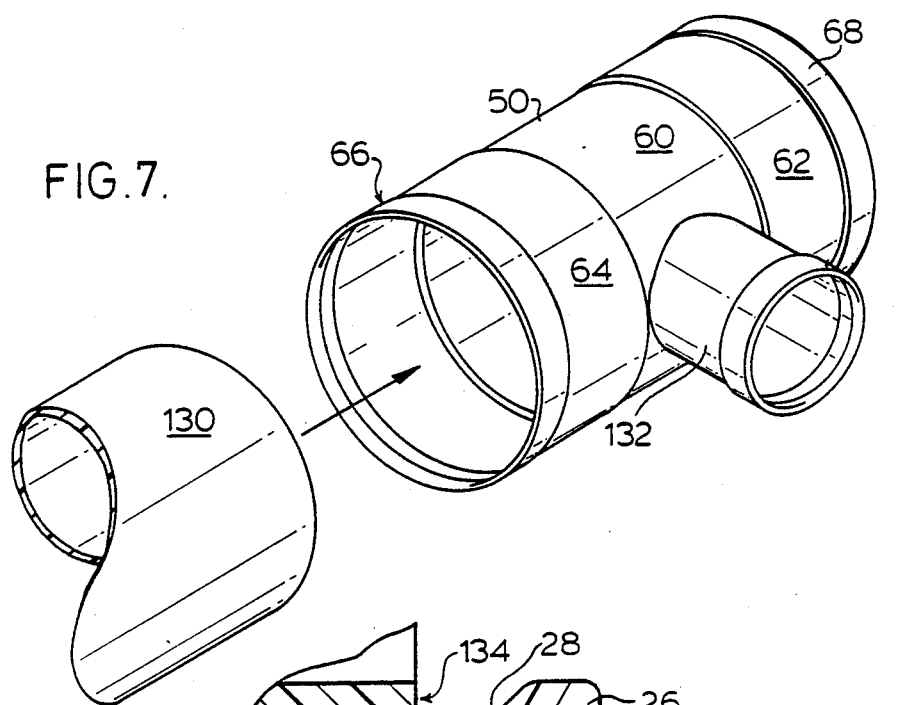
FIG. 7 is a perspective view of a fitting constructed according to a preferred embodiment of the invention being used to secure the spigot end of a pipe to it.

For bending wall 70 to the position shown in FIG. 6 and with reference to FIGS. 2 and 3, stand 100 and press 114 are used. Stand 100 comprises base 102 supporting upright posts 104 and cross members 106 and 108 for connecting the tops of posts 104, inwardly directed lips 107A and 107B extending from posts 104¹ and 104¹¹ at the front of the stand, and support ring structure 110 made up of two halves, llOA, one of which is fixed to supports 106 and 108 and to lips 107A and 107B. The other half llOA of structure 110 is pivotally secured at 112 to the supported half llOA. The opening when sections llOA are closed to form annular support 110 is to permit walls 64, 60 and 62 to pass therethrough, but not bell couplings 66 and 68. This is because of ledge 67 connecting wall 64 to bell 66 or wall 62 to bell 68. Thus bells 66 and 68 are of greater diameter than the central opening when the halves llOA of support 110 are closed together. Thus annular ledge 67 sits on support 110 when coupling 50 is seated on support 110 (see FIG. 3). Thereafter, gasket 20 is placed in bell coupling 66 in the position shown in FIG. 3 and vertically reciprocable press 114 is reciprocated from a position spaced from support 110 to a position proximate support 110 so that when the coupling 50 is carried by support 110, press 114 will act on wall 70 to bend it over. In this regard, the inside of press 114 includes an inner vertically-extending annular wall 116 having a radius just greater than the radius of the outer surface of annular wall 70. This wall 116 terminates upwardly in annularly-extending semicircular arch portion 118 which terminates in downwardly-extending wall portion 120. Thus when press 114 is brought to bear on wall 70, wall 70 is forced to conform to the inner surface shape of arch 118, thus taking up the position shown in FIG. 6, securing gasket 20 within the bell. Heating (not shown) may be utilized to facilitate this bending motion. The curving of portion 43 from point 51 being longitudinally closer to rear wall 36 than juncture 49 precludes radial inward movement of the hook formation when wall 70 is caused to be bent over to secure gasket 20 in the bell.

Figure 10:
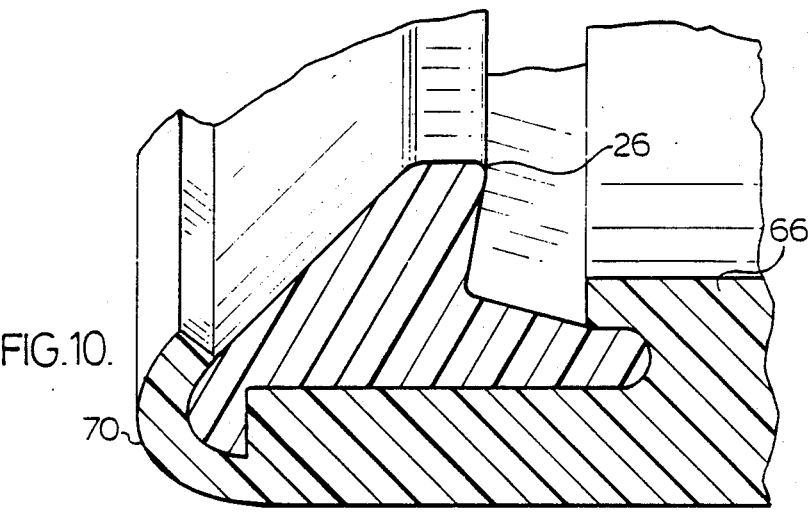
FIG. 10 shown with FIG. 1 is a partly cross-sectional perspective view of a further embodiment of the invention.

With reference to FIG. 10, an alternate form of gasket and bell 66 is shown which does not include recess 76 in wall 74 of bell and protuberance or projection 46 extending from wall 44 of the offset portion 42 of the gasket.

FIGS. 7, 8, 8A and 9 illustrate the securing of bevelled spigot 130 to fitting 50, constructed similarly to coupling 50 with added pipe fitting outlet 132 being the only difference.

Figure 8:
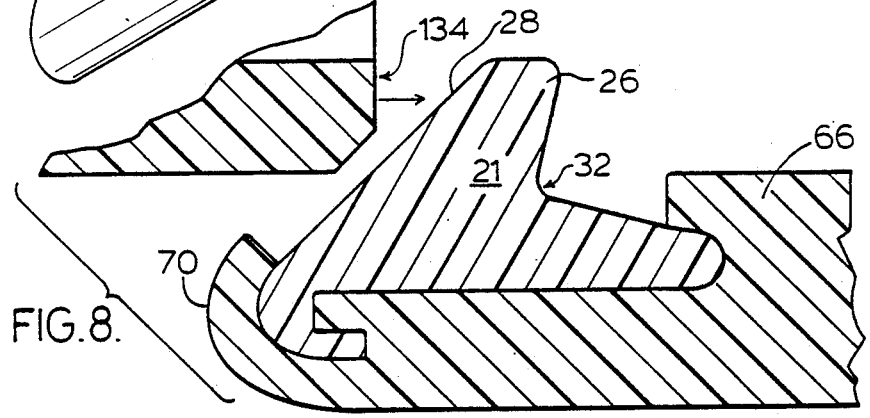
FIG. 8 is a cross-sectional view of the components shown in FIG. 7 being joined.
Figure 8A:
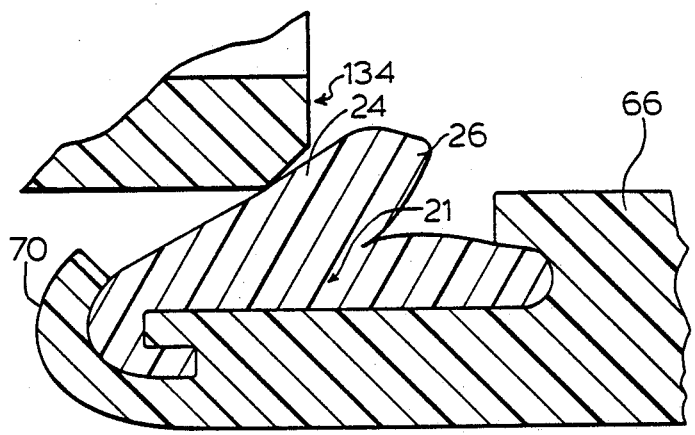
FIG. 8A is a cross-sectional view of the components shown in FIG. 8 at a later position during joining.
Figure 9:
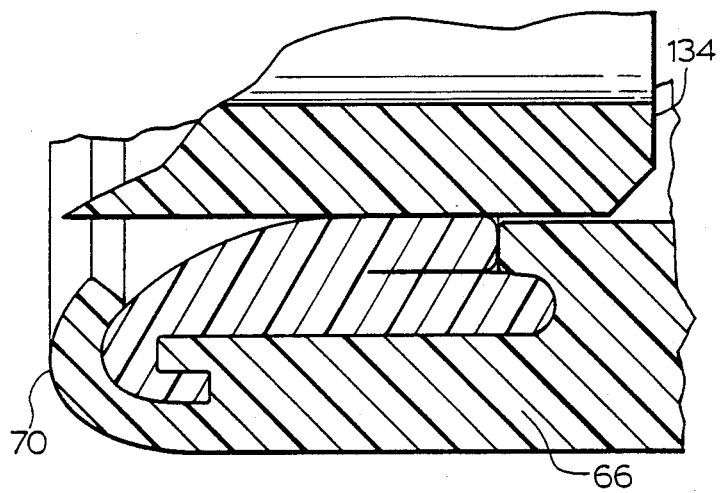
FIG. 9 is a cross-sectional view of the components shown in FIG. 8 joined together.

With reference to FIGS. 8, 8A and 9 as bevelled spigot end 134 is advanced into bell 66, it engages the sealing surface 28 of sealing lip or wing 24, stretching it and as it passes over the stretched portion radially compresses it, thus bending wing 24 at 32, causing end 26 of wing 24 to sit on inner wall 38 of gasket body portion 21. As wing 24 is stretched longitudinally away from end 40, the pulling of gasket out of the groove is prevented by opposing end 36 engaging wall 84 and being confined between lip 86 and bottom 82 and by offset portion 42 locked (sandwiched) in the space between bent-over wall 70 and wall 74 (see FIG. 10) and where present by projection 46 lodged in recess 76 (see FIGS. 8, 8A and 9).

As many changes can be made to the embodiments of the invention without departing from the scope of the invention, it is intended that all material contained herein be interpreted as illustrative of the invention and not in a limiting sense.

The embodiments of the invention in which an exclusive property of privilege is claimed are as follows:

1. An end portion of a member having a central longitudinal axis, the member at its very end defining a mouth, the end portion having an annular groove for receiving a gasket, the groove presenting a first end wall spaced from, and axially facing, the mouth and having a radial inward end and a radial outward end, a radially inwardly facing axially extending bottom wall extending substantially parallel to the longitudinal axis towards the mouth and extending from the radial outward end of the first end wall, the bottom wall terminating at a second wall axially facing the mouth and extending radially outwardly from the bottom wall, the second wall having a radial inward end and a radial outward end, the radial inward end of the second wall connected to the bottom wall, the radial outward end of the second wall terminating further from the longitudinal axis than the bottom wall, the second wall terminating at its radial outward end at a radially facing wall extending axially away from the bottom wall towards the mouth for part of its extension and then being bent over to extend towards the longitudinal axis; the gasket being annular, of resilient yieldable material and having a central longitudinal axis, axially spaced opposing ends interconnected by an outer wall extending substantially parallel to the axis of the gasket for engaging the bottom wall of the groove, an inner wall radially closer the longitudinal axis than the outer wall, an integral sealing lip extending from the inner wall of the gasket, one of the opposing ends of the gasket extending from the outer wall towards the longitudinal axis of the gasket engaging the first end wall of the groove, the other opposing end of the gasket extending away from the longitudinal axis of the gasket and comprising an offset portion on the radial side of the outer wall remote from the longitudinal axis, the offset portion for being received between, an in intimate contact with, the second wall and, the radially facing axially extending wall bent over the offset portion to extend towards the longitudinal axis thereby locking the gasket body against movement axially in a direction away from the mouth permitting the sealing lip to be stretched.

2. The end portion of claim 1, wherein a curved surface is provided on the axial side of the offset portion remote from the outer wall.

3. An end portion of a member having a central longitudinal axis, the member at its very end defining a mouth, the end portion having an annular groove for receiving a gasket carrying an offset portion, the groove presenting a first end wall spaced from, and axially facing, the mouth and having a radial inward end and a radial outward end, a radially inwardly facing axially extending bottom wall extending substantially parallel to the longitudinal axis towards the mouth and extending from the radial outward end of the first end wall, the bottom wall terminating at a second wall axially facing the mouth and extending radially outwardly from the bottom wall, the second wall having a radial inward end and a radial outward end, the radial inward end of the second wall connected to the bottom wall, the radial outward end of the second wall terminating further from the longitudinal axis than the bottom wall, the second wall having a recess opening therethrough radially spaced from the radial inward end of the second wall, the recess extending generally in the same direction as the bottom wall towards the first end wall and the offset portion of the gasket carries a projection extending axially longitudinally away from the mouth and offset portion for extending into the recess in intimate contact therewith, a radially facing wall extending axially away from the bottom wall towards the mouth for part of its extension and then being bent over to extend towards the longitudinal axis; the gasket being annular, of resilient yieldable material and having a central longitudinal axis, axially spaced, opposing ends interconnected by an outer wall extending substantially parallel to the axis of the gasket engaging the bottom wall of the groove, an inner wall radially closer the longitudinal axis than the outer wall, an integral sealing lip extending from the inner wall of the gasket, one of the opposing ends of the gasket extending from the outer wall towards the longitudinal axis of the gasket engaging the first end wall of the groove, the other opposing end of the gasket extending away from the longitudinal axis of the gasket and comprising an offset portion on the radial side of the outer wall remote from the longitudinal axis, the offset portion being received between, and in intimate contact with the second wall and the radially facing axially extending wall bent over the offset portion to extend towards the longitudinal axis thereby locking the gasket body against movement axially in a direction away from the mouth permitting the sealing lip to be stretched.

4. The end portion of claim 1, 2 or 3 inclusive, wherein the axially facing first end wall extends towards the central longitudinal axis of the member at an angle of less than about 90 degrees to the bottom wall of the groove.

5. The end portion of claim 1, 2 or 3 inclusive, wherein the first end wall extends towards the central longitudinal axis at an angle of substantially 90 degrees to the central longitudinal axis.

6. The end portion of claim 1, 2 or 3 inclusive, wherein the first end wall extending towards the central longitudinal axis forms an arc curving towards the mouth of the member.

7. The end portion of claim 1, 2 or 3 inclusive, wherein the first end wall carries at its radial inward end a lip directed axially longitudinally towards the mouth of the member which lip overlies the opposing end of the gasket remote the offset portion.

8. An end portion of a member, the end portion including a gasket attached thereto, the end portion comprising a mouth, a central longitudinal axis, an axially facing first end wall remote from the mouth, a radially facing axially extending wall extending towards the mouth for part of its extension and being bent over to extend towards the longitudinal axis, an axially facing radially extending second wall closer to the mouth than the axially facing first end wall, said second wall having an inner radial end and an outer radial end, the outer radial end joined to the axially extending wall, a bottom wall extending longitudinally away from the mouth to the axially facing first end wall extending radially towards the central longitudinal axis, said gasket comprising a central longitudinal axis, axially spaced, opposing ends, an outer wall extending parallel to, and spaced radially from the longitudinal axis of the gasket and interconnecting the opposing ends, an inner wall closer the longitudinal axis of the gasket than the outer wall, a sealing lip, one of the opposing ends carrying an offset portion radially offset from the outer wall on the radial side of the outer wall remote from the longitudinal axis of the gasket, the offset portion being received between, and in intimate contact with, the second wall and the radially facing axially extending wall bent for part of its extension over the offset portion to extend towards the longitudinal axis thereby locking the gasket body against movement axially in a direction away from the mouth and permitting the sealing lip to be stretched.

9. The combination of claim 7 or 8, wherein the sealing lip has a sealing surface which extends in a direction obliquely angularly away from the offset portion of the gasket to an end radially spaced from the inner wall, the end overlying the inner wall of the gasket, with no gasket material therebetween, permitting the end of the sealing lip to be folded thereby causing the end of the sealing lip to lie on the inner wall of the gasket when the sealing lip is folded onto the gasket, whereby when the radially facing wall extending away from the bottom wall is bent over the offset portion of the gasket to extend towards the longitudinal axis capturing the offset portion between the now bent over wall and second wall, and with the outer wall of the gasket engaging the bottom of the groove and with the opposing end of the gasket extending from the outer wall extending towards the longitudinal axis of the gasket engaging the first end wall, the gasket is locked against movement longitudinally in the direction away from the mouth so that upon entry of a spigot the sealing lip is permitted to stretch away from the mouth decreasing the radial thickness of the sealing lip reducing the required insertion force for inserting the spigot into the member without compromising the integrity of the seal formed and permitting the stretched sealing lip to fold onto the gasket after the leading end of the spigot has passed the body of the gasket thereby providing an effective seal.

10. The assembly of claim 8, wherein the axially facing first end wall carries a longitudinally extending lip extending towards the mouth which overlies the opposing end of the gasket remote from the offset portion.

11. The assembly of claim 8, wherein the offset portion of the gasket presents a curved surface on the axial side of the offset portion remote from the outer wall.

12. An end portion of a member, the end portion carrying a gasket, the end portion comprising a mouth, a central longitudinal axis, an axially facing first end wall remote from the mouth, a radially facing axially extending wall extending towards the mouth for part of its extension and being bent over to extend towards the longitudinal axis, an axially facing radially extending second wall closer to the mouth than the axially facing first end wall, said second wall having an inner radial end and an outer radial end, the radially extending second wall has a recess opening therethrough radially spaced from the inner radial end, the recess extending generally in the same axial direction as the longitudinal axis, a bottom wall extending longitudinally away from the mouth to the axially facing first end wall extending radially towards the central longitudinal axis, each gasket comprising a central longitudinal axis, opposing ends, an outer wall extending parallel to, and spaced radially from the longitudinal axis of the gasket and interconnecting the opposing ends, an inner wall closer the longitudinal axis of the gasket than the outer wall, a sealing lip, one of the opposed ends carrying an offset portion radially offset from the outer wall on the radial side of the outer wall remote from the longitudinal axis of the gasket, the offset portion carries a projection which projection extends axially parallel to the outer wall and longitudinal axis and extends axially away from said mouth, the offset portion being received between and in intimate contact with the second wall and the radially facing axially extending wall bent for part of its extension over the offset portion, the projection being received in the recess in the second wall, thereby locking the gasket against movement axially in a direction away from the mouth.

13. The assembly of claim 12, wherein the projection is the same shape and size as the recess.

14. The end portion of claim 1, 3, 8, 12, 10 or 13, wherein the radially facing wall extending axially towards the mouth for part of its extension and being bent over to extend towards the longitudinal axis terminates radially inwardly of the bottom wall of the end portion of the member.

15. The end portion of claim 1, 3, 8, 12 10 or 13 wherein the radially facing wall extending axially towards the mouth for part of its extension and being bent over to extend towards the longitudinal axis terminates radially inwardly of the bottom wall of the end portion of the member to substantially overlap the radial inward end of the first end wall.

16. The assembly of claim 8, 12, 10, 11 or 13 inclusive, wherein the axially facing first end wall extends towards the central longitudinal axis of the member at an angle of less than about 90 degrees to the bottom wall of the groove.

17. The assembly of claim 8, 12, 10, 11 or 13 inclusive, wherein the first end wall extends towards the central longitudinal axis at an angle of substantially 90 degrees to the central longitudinal axis.

18. The assembly of claim 8, 12, 10, 11 or 13 inclusive, wherein the first end wall extending towards the central longitudinal axis forms an arc curving towards the mouth of the member.

19. The assembly of claim 8, 12, 11 or 13, wherein the first end wall carries at its radial inward end a lip directed axially longitudinally towards the mouth of the member which lip overlies the opposing end of the gasket remote the offset portion.

* * * * *